United States Patent

Boudah

Patent Number: 5,143,415
Date of Patent: Sep. 1, 1992

[54] DISASSEMBLABLE, LIGHTWEIGHT TRUCK UTILITY RACK

[75] Inventor: Michael Boudah, Seal Beach, Calif.

[73] Assignee: Jemb Rack Systems, Inc., Huntington Beach, Calif.

[21] Appl. No.: 708,496

[22] Filed: May 31, 1991

[51] Int. Cl.⁵ .............................................. B60R 9/00
[52] U.S. Cl. ........................................ 296/3; 224/325
[58] Field of Search .................. 296/3; 224/309, 310, 224/315, 317, 320, 321, 322, 325

[56] References Cited

U.S. PATENT DOCUMENTS

| | | | |
|---|---|---|---|
| 2,720,414 | 10/1955 | Hart | 296/3 X |
| 2,947,566 | 8/1960 | Tower | 296/3 X |
| 2,997,330 | 8/1961 | Boultinghouse | 296/3 |
| 3,224,805 | 12/1965 | Clyatt | 296/10 |
| 3,460,864 | 8/1969 | Piercy | 296/3 |
| 3,594,035 | 7/1971 | Ferguson | 224/309 X |
| 3,734,110 | 5/1973 | Burns | 296/10 X |
| 3,765,713 | 10/1973 | Suitt | 224/309 X |
| 4,057,281 | 11/1977 | Garrett | 224/42.32 X |
| 4,138,046 | 2/1979 | DeFreze | 296/3 X |
| 4,211,448 | 7/1980 | Weston | 296/3 |
| 4,215,894 | 8/1980 | Sidlinger | 224/321 X |
| 4,270,681 | 6/1981 | Ingram | 224/321 |
| 4,278,376 | 7/1981 | Hunter | 410/130 |
| 4,295,587 | 10/1981 | Bott | 224/322 X |
| 4,364,500 | 12/1982 | Bott | 224/325 |
| 4,398,763 | 8/1983 | Louw | 296/3 |
| 4,405,170 | 9/1983 | Raya | 296/3 X |
| 4,444,427 | 4/1984 | Martin | 296/3 X |
| 4,770,458 | 9/1988 | Burke et al. | 296/3 |
| 4,779,916 | 10/1988 | Christie | 296/3 |
| 4,955,771 | 9/1990 | Bott | 410/130 X |

Primary Examiner—Margaret A. Focarino
Assistant Examiner—Joseph D. Pape
Attorney, Agent, or Firm—Spensley Horn Jubas & Lubitz

[57] ABSTRACT

A truck utility rack which is made up of assemblable pieces which allow for different configuration of size and shape. It is easy to assemble and disassemble and is light weight making it easy to store and transport when not in use. When stored in a noise (rattle) suppressing carrying case, can be carried in the cab of a truck without interfering with passengers. The truck rack can be put up in part, i.e., one vertical stanchion just to hand objects from on the back of a pickup truck or it can be assembled as the more typical rectangular overhead rack for carrying objects above the bed of a pickup truck.

6 Claims, 6 Drawing Sheets

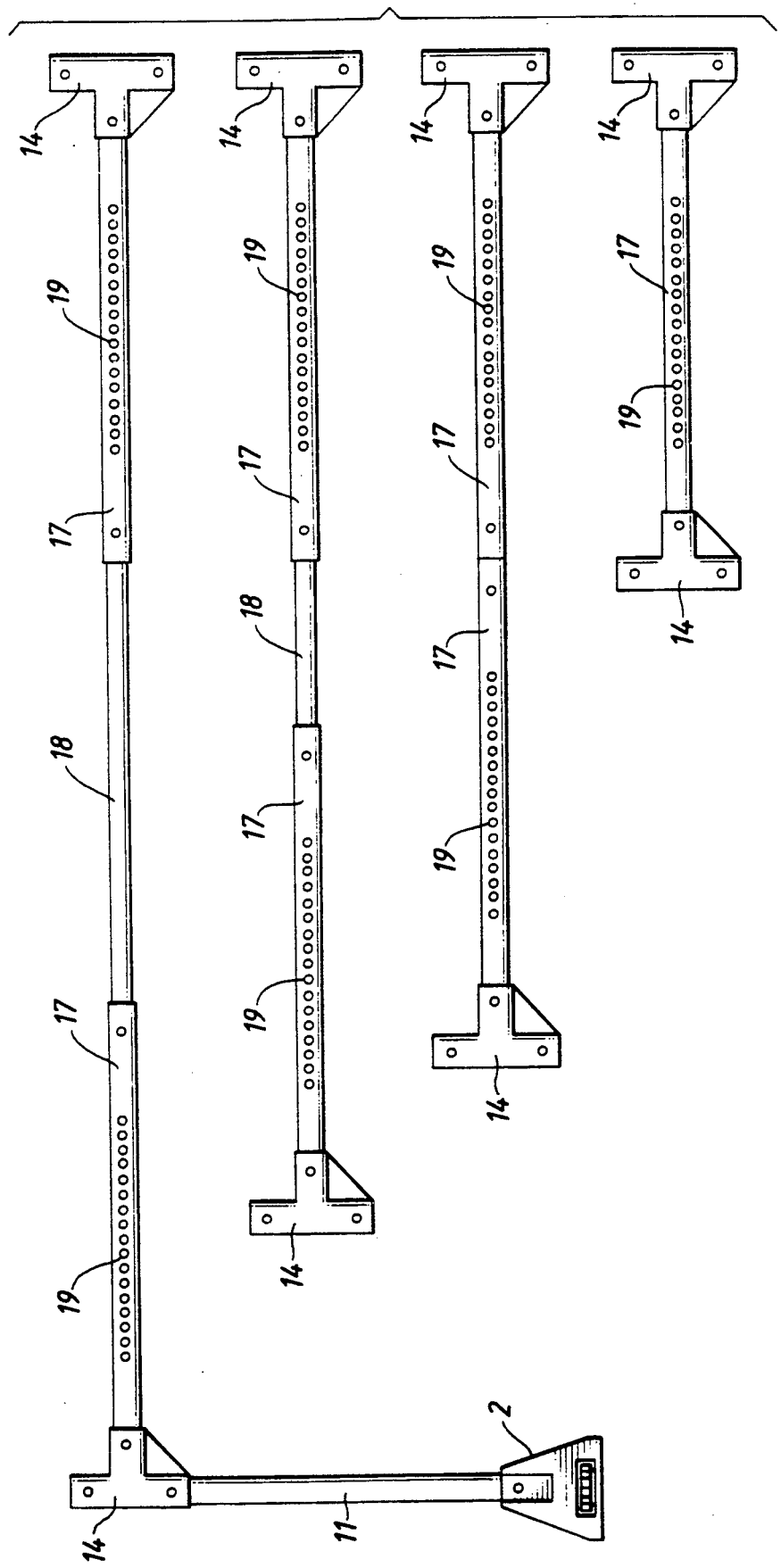

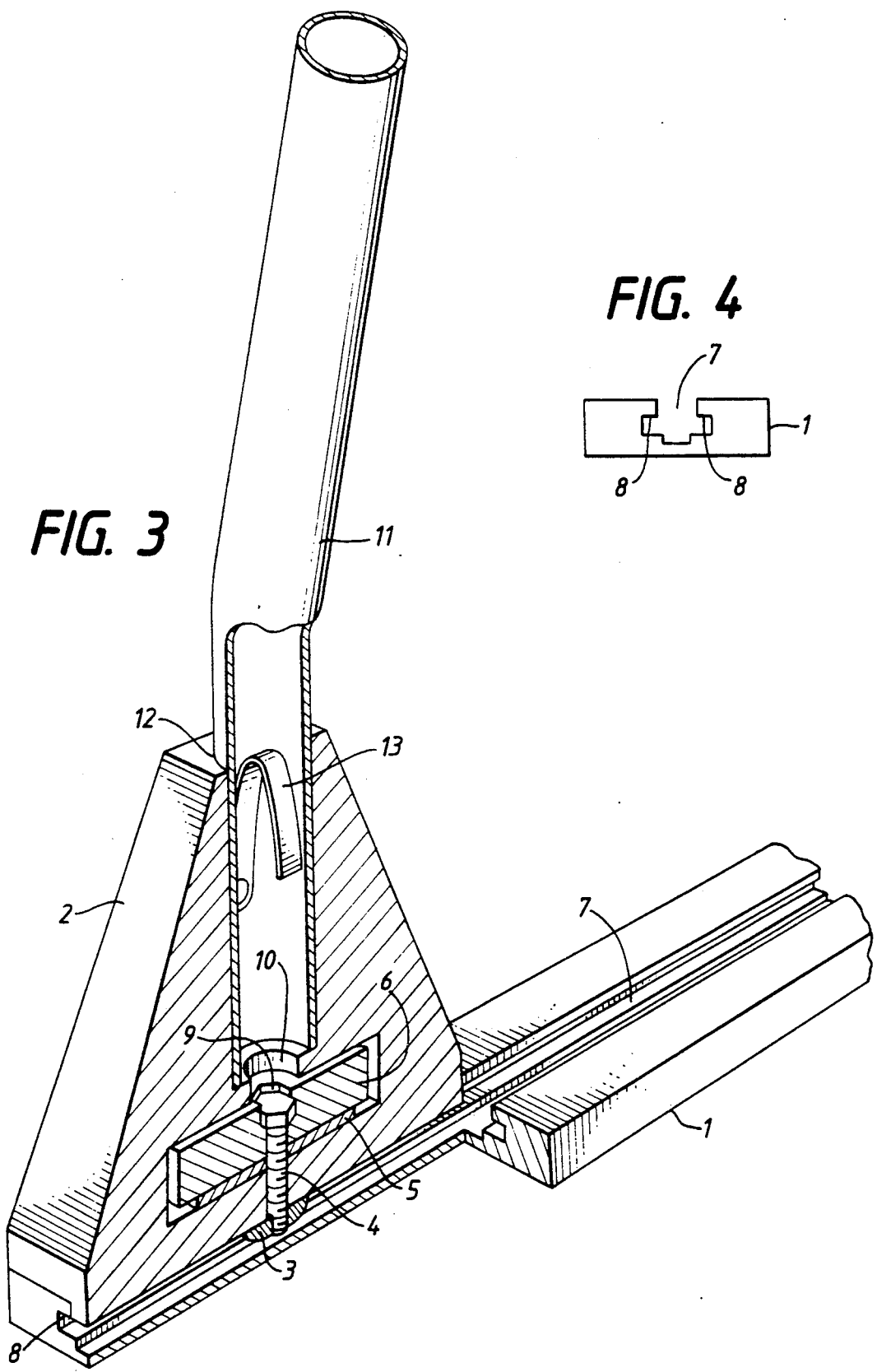

DISASSEMBLABLE, LIGHTWEIGHT TRUCK UTILITY RACK

FIELD OF THE INVENTION

This invention relates to devices used with trucks, particularly pickup trucks, for carrying material at an elevation over the bed of a truck. These are usually considered utility racks and keep the truck bed free for carrying items while allowing other items to be hung or suspended above for transport.

DESCRIPTION OF RELATED ART

Currently in use are many types of truck utility racks from ones that are welded or by some other permanent means assembled and then temporarily or permanently attached to a truck to those which are collapsible, removable or in some other way may be moved out of the way when not in use. Examples of such devices are found in U.S. Pat. Nos. 4,770,458, 4,405,170, 2,270,414 and others.

The present invention combines the idea of the truck utility rack with the idea of simple assembly and disassembly along with the idea of light weight yet sturdy construction. This provides a truck utility rack which serves as a structure for use in carrying items above the truck bed along with the ability to quickly disassemble the rack for storage when not in use.

SUMMARY OF THE INVENTION

A primary objective of the present invention is to provide an easily assembled and disassembled truck utility rack with sufficient strength to carry objects such as ladders, pipes, sporting equipment and other items above the bed of the truck. This frees the truck bed for carrying other objects. A further object of the invention is to provide the rack in a form that when disassembled is compact enough to be stored in a truck compartment or behind the truck seat.

Another object of the instant device is to be able to assemble and disassemble the upright portion rack without the use of any tools. An additional objective of the invention is for the rack to mount on the side panels of a pickup truck such that no truck bed space is required and to be adjustable to varying lengths of truck beds. This also allows the rack to be adjusted to various lengths when a rack of shorter length than the truck bed is desired. A further feature also allows accommodation to different widths of truck bed.

Another object is to provide ease of replacement if one of the components of the rack is broken.

In accordance with the description presented herein other objects of this invention will become apparent when the description and drawings are reviewed.

BRIEF DESCRIPTION OF THE DRAWINGS

FIG. 2 illustrates the rack cross members assembled at different lengths and a stanchion with base attached.

FIG. 3 illustrates a stanchion, base, and rail track cross section with the locking knob, bolt, washer and nut shown in a locked in position.

FIG. 4 illustrates a cross section of the rail track.

DESCRIPTION OF THE PREFERRED EMBODIMENT

The truck utility rack consists of tubular cross members, connecting corners, tubular stanchions, connecting bases and rail tracks for mounting on pickup truck bed side walls. The various elements of the rack are locked together by springed push pins locked in apertures for easy snap release except that the bases are locked in the rail tracks by a bolt and nut. The rack system can be made of any structural material of sufficient strength, but aluminum and molded plastic are preferred for most elements to provide strength along with light weight for ease in handling.

Figure 1:
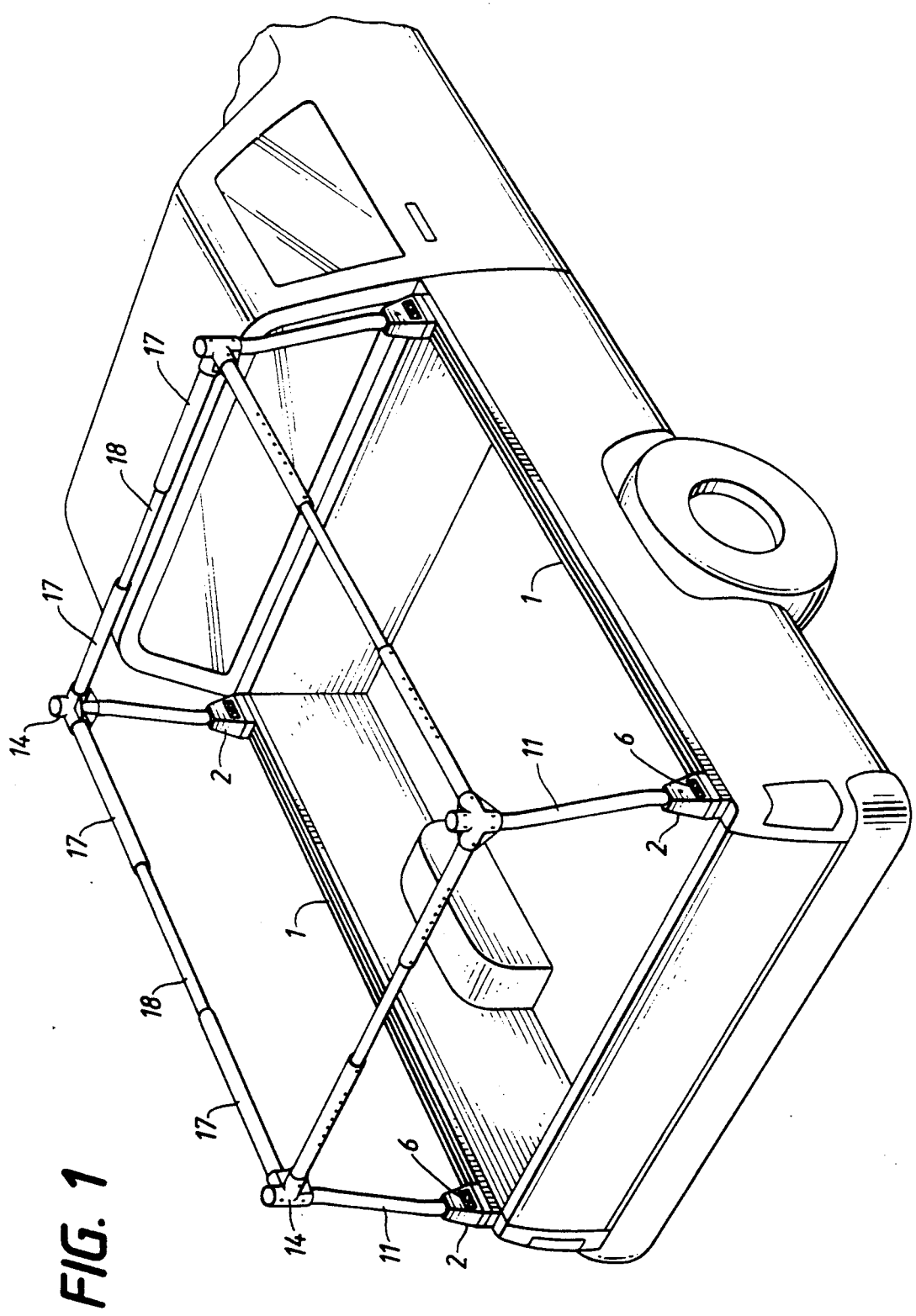
FIG. 1 illustrates a perspective view of the utility rack mounted to a pickup truck.
Figure 5:
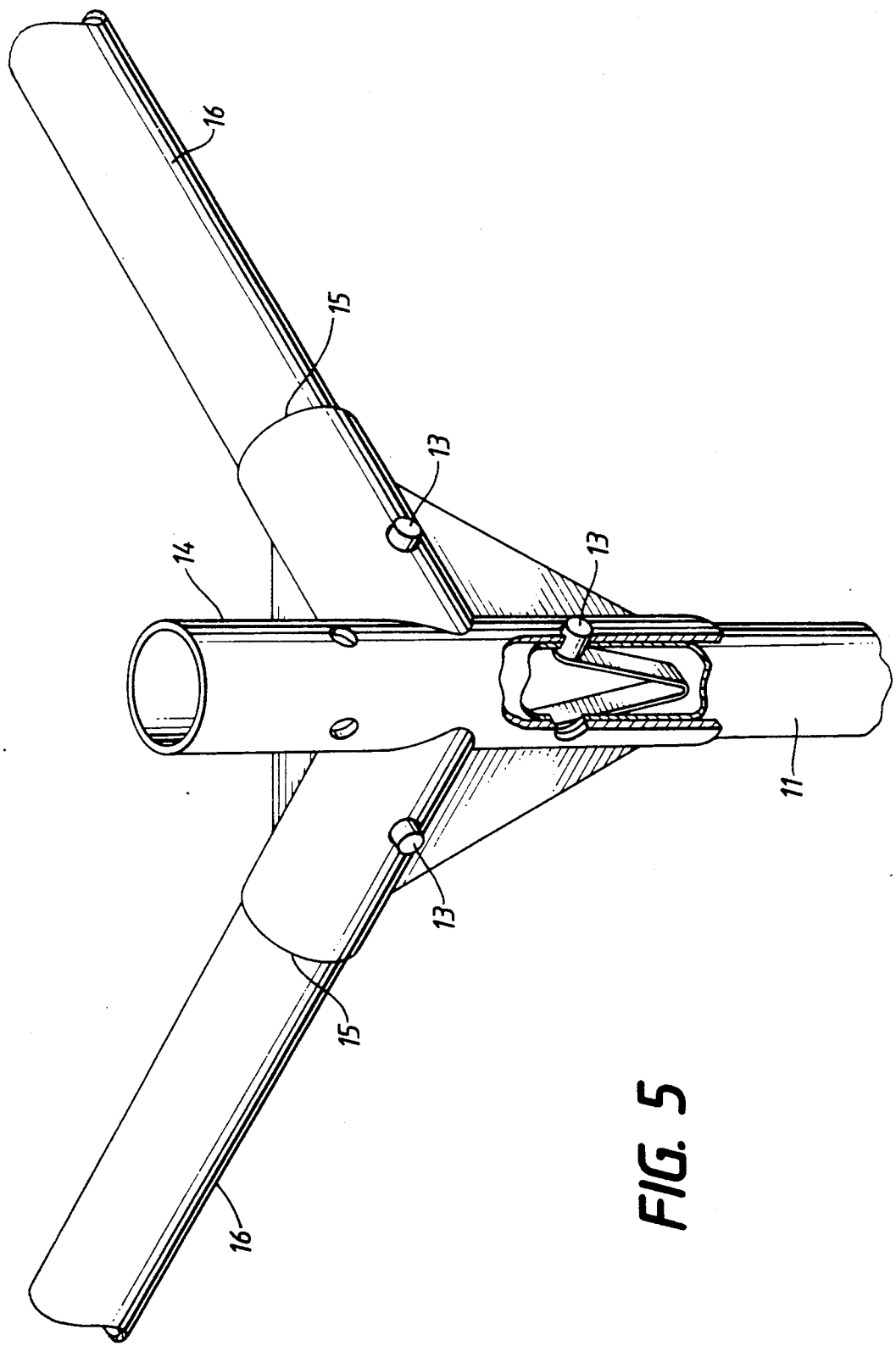
FIG. 5 illustrates a corner with stanchion and cross members attached.
Figure 6:
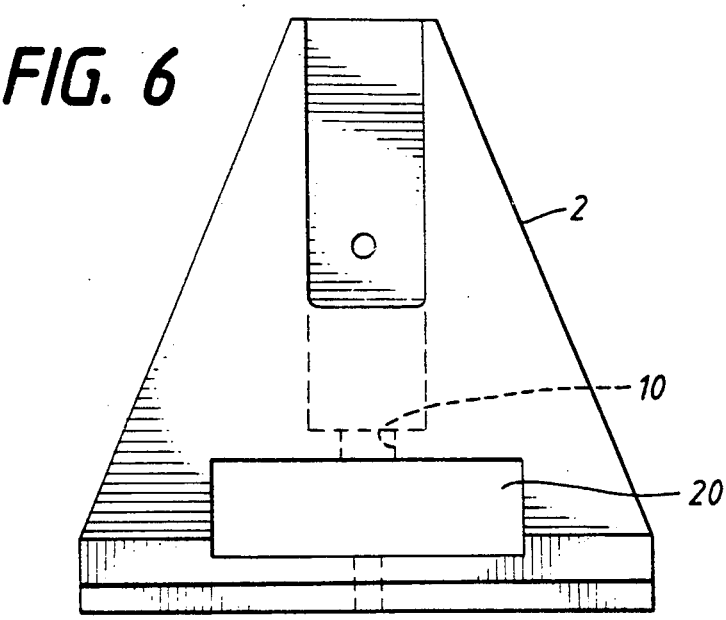
FIG. 6 illustrates a base.
Figure 7:
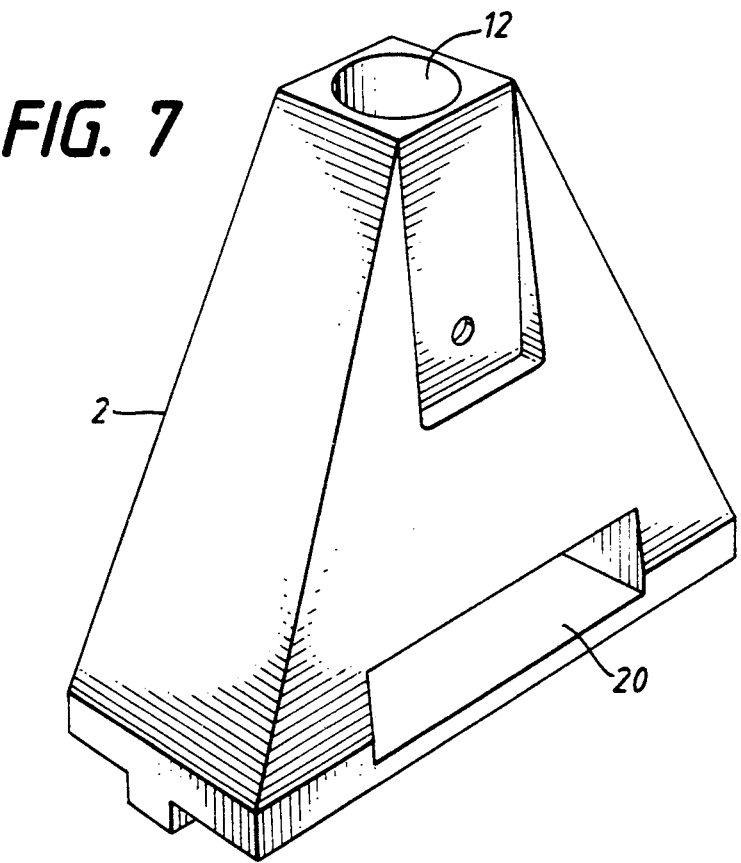
FIG. 7 illustrates a perspective view of a base.
Figure 8:
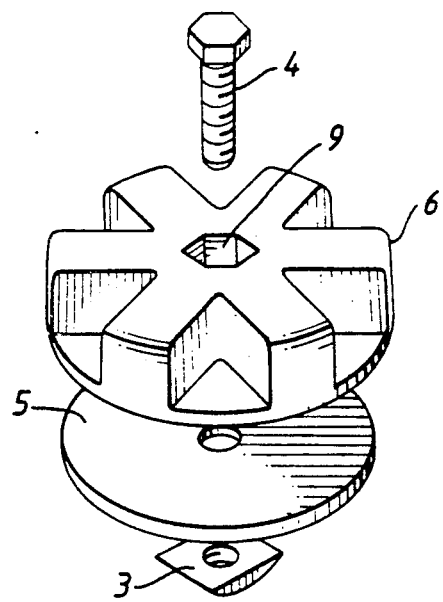
FIG. 8 illustrates a perspective view of the locking knob, bolt, washer and nut.
Figure 9:
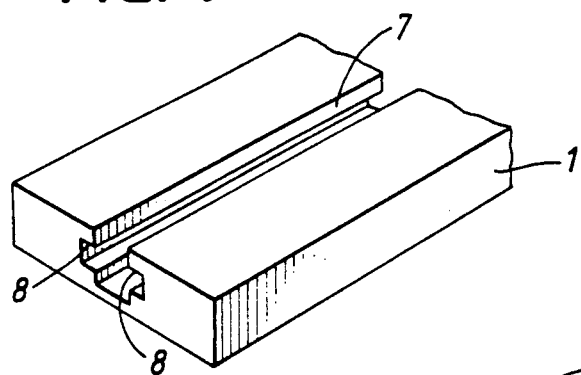
FIG. 9 illustrates a perspective view of a portion of the rail track.
Figure 10:
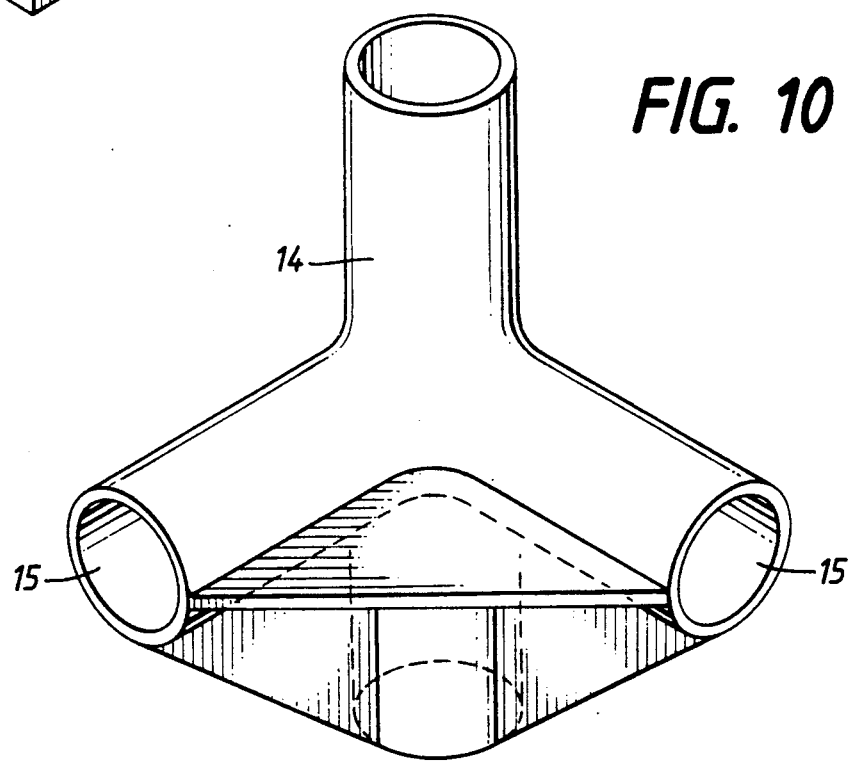
FIG. 10 illustrates a perspective view of a corner.

Referring to FIGS. 1 through 10, the truck utility rack has a rail track (1) permanently mounted to the side wall of a pickup truck. A base (2) is attached to the rail track (1) by a nut (3), bolt (4), washer (5) and locking knob (6). The nut (3) fits in the cross shaped slot (7) which runs the length of the rail track (1).

The nut (3) is designed to fit into the slot (7) to engage the edges (8) and be slid to the proper position. When the base (2) is in proper position the locking knob (6) is turned or rotated thus turning the bolt (4) as the hex shaped aperture (9) fits the hex head of the bolt (4). A locking knob aperture (20) in the base (2) allows the locking knob (6) and washer (5) to be inserted in the base (2) and provides access to turn the locking knob (6). Also a bolt aperture (10) is provided to allow insertion of the bolt (4) in the locking knob (6) and washer (5). The locking knob (6) is rotated to lock the nut (3) against the edges (8) and the locking knob (6), washer (5) and bolt (4) against the base (2) which locking creates enough friction between the base (2) and rail track (1) surfaces where the two elements contact such that the base (2) is held in a fixed position relative to the rail track (1). The base tab prevents the base (2) from rotating relative to the rail track (1).

Normally four base (2) elements are used to hold the utility rack stanchions (11) which are inserted into a base aperture (12) and locked in place by spring push pin (13) fit into a base lock aperture (22). The stanchions (11) can be of varying height and shape depending on the height of the rack above the truck bed desired or the truck cab height if interference is a problem. The stanchions (11) may also be of varying shape depending on the configuration desired. In the preferred embodiment they are angled toward the truck bed to provide added strength for the structure.

At the end of the stanchions (11) opposite the base (2) a corner (14) is attached by a spring push pin (13) fit in a corner lock aperture. The corner (14) has two member apertures (15) at right angles to each other for insertion and attachment of tubular cross members (16) where the cross members (16) consist of one or two tubular receptors (17) and a tubular insert (18) when two receptors (17) are used. The insert (18) is held in place by spring push pins (13) in receptor apertures (19) to provide the desired length of a cross member (16). For short cross members (16) only one receptor (17) need be used. Various length configurations are illustrated in FIG. 2.

By use of four cross members (16) a rectangular structure is created above the truck bed at the height of the stanchions (11). This provides a solid structure on which to place ladders, pipe, sporting equipment or other materials and objects for transport. In addition, objects may be tied or attached in some manner to hang from the truck rack.

I claim:

1. An apparatus for carrying objects over an open bed of a truck, the open bed having two opposed longitudinal sides, said apparatus comprising:

two rail tracks each mountable at a respective longitudinal side of the open bed, each track having a length dimension and being provided with a slot which extends along the length dimension;

two pairs of base members, each pair of base members being associated with a respective track, each said base member being formed to define a stanchion-receiving aperture:

a plurality of fastening means each associated with a respective one of said base members for detachably fastening each of said base members to its associated track at any selected point along the length dimension of said associated track, each said fastening means including a first fastening member which is retained in the respective base member and a second fastening member which is retained in said slot of a respective one of said tracks, said first and second fastening members being detachably engageable with one another to secure said respective base member to said respective track, so that said aperture of said respective base member is oriented in a substantially upward direction;

four elongate stanchions each having opposed first and second ends, said first end of each said stanchion being insertable into said stanchion-receiving aperture of a respective one of said base members to extend substantially vertically;

four cross members each composed of at least two parts which are telescopically engaged with one another to permit adjustment of the length of each said cross member;

four corner members each formed to define two at least approximately mutually perpendicular cross member-receiving apertures and a stanchion-receiving aperture, said second end of each said stanchion being insertable into said stanchion-receiving aperture of a respective one of said corner members and one end of each said cross member being insertable into a respective cross member-receiving apertures of a respective one of said corner members to form a rack structure in which said cross members form a rectangular frame which lies in at least a substantially horizontal plane and which is supported at a defined height above the open bed of the truck by said stanchions; and spring-loaded locking means for locking each end of each of said stanchions and each end of each of said cross members in a respective one of said apertures in a releasable manner.

2. The apparatus as in claim 1 wherein each said stanchion is tubular shaped and made of aluminum.

3. The apparatus as in claim 1 wherein each said cross member is tubular shaped and made of aluminum and each said corner member is made of molded plastic.

4. The apparatus as in claim 1 wherein each said rail track and each said base member is made of molded plastic.

5. The apparatus as in claim 1 wherein:

said slot in each said rail track is cross shaped;

said second fastening member of each said fastening means is a nut which is slidable along said slot of a respective one of said rail tracks;

said first fastening member of each said fastening means includes a bolt which is the threadedly engageable in said nut, and a locking knob which engages with said bolt for rotation with said bolt; and each said base member has a locking knob aperture via which said locking knob of a respective fastening means is accessible from outside said base member.

6. The apparatus as in claim 1 wherein said locking means comprises a plurality of spring mounted push pins each secured in a respective end of one of said stanchions and said cross members, and each said stanchion-receiving aperture and cross member-receiving aperture has an opening for receiving a respective push pin.

* * * * *